INVENTOR.
EDWARD J. HERBENAR
HOWARD A. SMITH

Hill, Sherman, Meroni, Gross & Simpson
ATTORNEYS

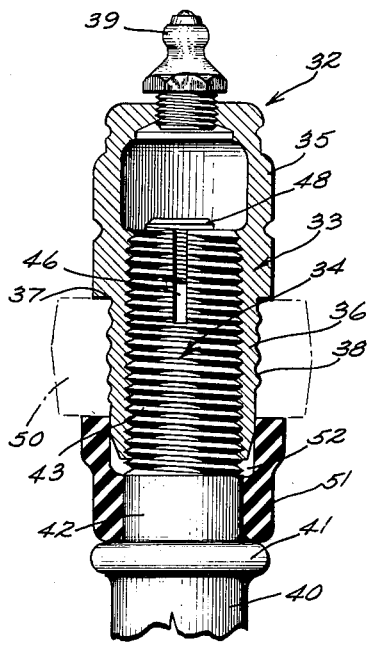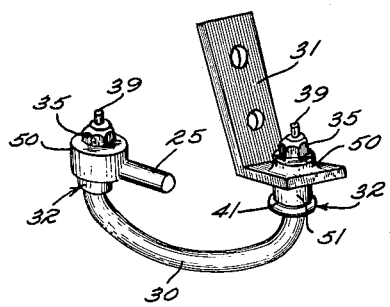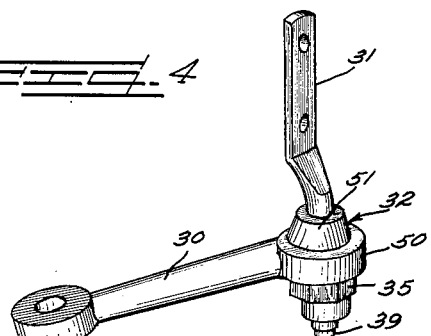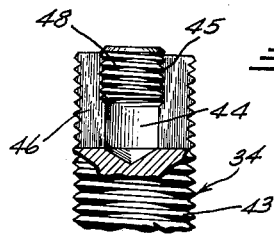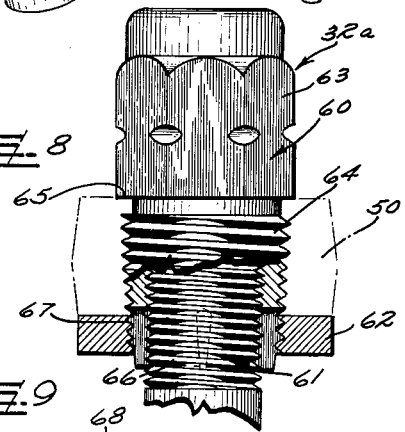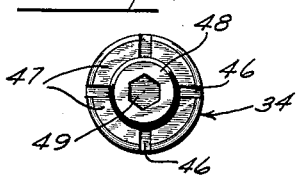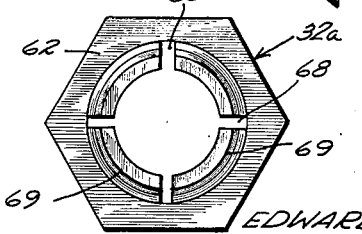
INVENTOR.
EDWARD J. HERBENAR
HOWARD A. SMITH
ATTORNEYS

United States Patent Office

3,219,372
Patented Nov. 23, 1965

3,219,372
CONTROLLED TORQUE AND STABILITY PIVOT ASSEMBLIES FOR AUTOMOTIVE WHEEL SUSPENSIONS AND STEERING LINKAGES
Edward J. Herbenar and Howard A. Smith, Detroit, Mich., assignors to TRW Inc., a corporation of Ohio
Filed Nov. 14, 1963, Ser. No. 323,656
1 Claim. (Cl. 287—93)

This invention relates to threaded pivot assemblies for automotive steering linkages and wheel suspensions which are easily adjusted to produce a desired stability. Specifically this invention relates to threaded pivot assemblies for linkages and suspensions wherein radial torque and axial stability is readily adjusted by varying the diameter of one threaded joint part relative to its mating part.

The invention will hereinafter be specifically described as embodied in threaded pivot joints for automotive steering assemblies and wheel suspensions, but it should be understood that the principles of this invention are generally applicable to radial torque and axial stability control of pivot assemblies.

This invention makes possible the individual tuning of automotive steering linkages and wheel suspensions for producing and maintaining a desired steering resistance and vibration dampening effect as well as to compensate for wear encountered during use of the vehicle. Wheel shimmy is easily prevented, steering resistance is easily controlled and desirable variation can be quickly made to suit the preferences of an individual driver. As the tires of dirigible wheels wear there is a tendency for a buildup in wheel shimmy and a sense of lack of steering control. The present invention makes possible the quick adjustment of pivot joints in both the steering linkage and the wheel suspension which will stop the wheel shimmy and tighten the steering control.

The invention includes threaded together joint parts at the wheel arm pivots, the idler arm, and the idler arm bracket of a steering linkage. In one embodiment the inner threaded member of the joint is expanded by a plug to control the resistance to movement between the parts. In another embodiment the external member is contracted by a lock nut to control its resistance to movement relative to the inner part. In both embodiments the expansible threaded member and the contractible threaded member are slotted to accommodate the expansion or contraction. The external pivot member is also externally threaded for attachment to the boss of a cross link, a bracket arm, or a control arm and this external threading may be of the self-tapping type to form its own thread in the boss. In the expansible embodiment of the invention the expansion is effected by a tapered plug threaded into the slotted end of the internal pivot member. In the contractible embodiment of the invention the slotted end of the external pivot member is tapered to receive thereon a lock nut capable of contracting the slotted end.

It is then an object of this invention to provide a steering and suspension linkage for automotive vehicles which can be easily adjusted to control radial torque and axial stability of both the linkage and the suspension.

Another object of this invention is to provide a threaded pivot joint wheel suspension and steering linkage for automotive vehicles with devices for quickly adjusting and maintaining the radial torque and axial stability of the threaded together pivot components.

Another object of this invention is to provide a threaded pivot joint with either an expansible inner pivot member or a contractible outer pivot member and with means for either expanding the inner member or contracting the outer member to thereby control the torque resistance and axial stability of the joint.

A specific object of the invention is to provide a pivot joint for steering linkages and wheel suspensions with threaded together internal and external joint members wherein the inner joint member is slotted and expanded by a pipe plug threaded therein for controlling resistance of the joint.

Another object of the invention is to provide a threaded pivot joint with an external pivot member having a slotted end with a lock nut thereon adapted to contract the external member onto the internal member and thereby control the resistance of the joint.

A specific object of the invention is to provide a wheel suspension and steering linkage assembly embodying threaded pivot joints which are individually adjusted to control the steering resistance and the axial stability of the wheel suspension without uncoupling any of the linkages or suspension parts.

Other and further objects of this invention will be apparent to those skilled in the art from the following detailed description of the annexed sheets of drawings which, by way of preferred examples only, illustrate two embodiments of the invention.

On the drawings:

FIGURE 3 is a perspective view of an idler arm assembly equipped with a threaded pivot joint at both ends thereof.

FIGURE 4 is a perspective view of an idler arm bracket equipped with the threaded pivot joint of this invention.

FIGURE 5 is a longitudinal cross sectional view with parts in elevation of an expansible type threaded pivot joint of this invention mounted in a boss.

FIGURE 6 is a fragmentary elevational view with parts in cross section of the slotted end of the inner pivot of the joint of FIG. 5.

FIGURE 7 is an end elevational view of the slotted end of the inner pivot member of FIG. 5.

FIGURE 8 is a side elevational view, with parts in vertical cross section, of a contractible threaded pivot joint of this invention mounted in a boss.

FIGURE 9 is an end elevational view of the external pivot member and locking nut of the pivot assembly of FIG. 8.

As shown on the drawings:

Figure 1:
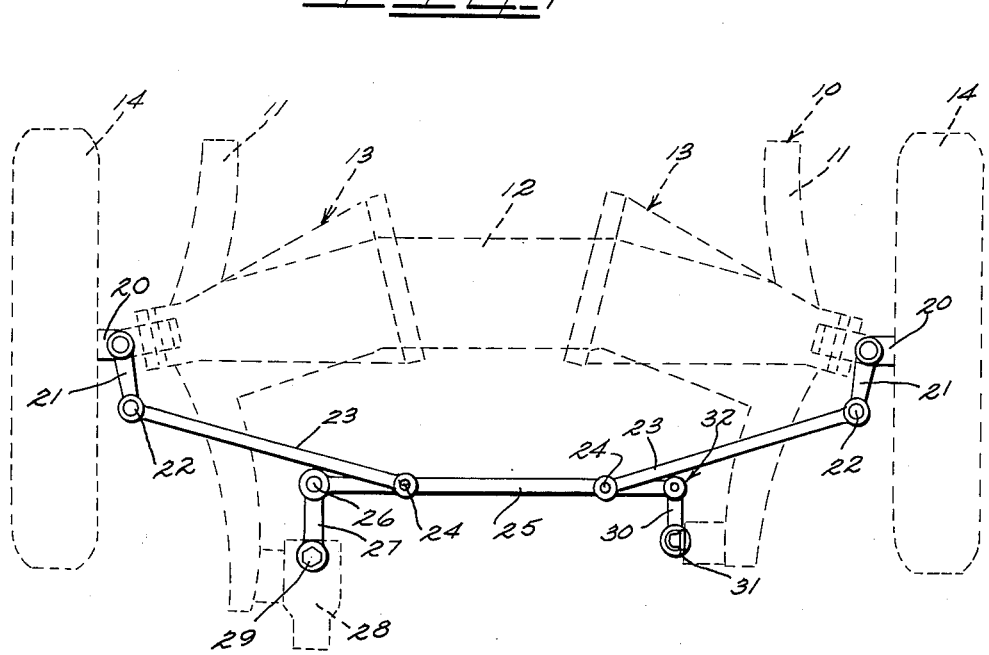
FIGURE 1 is a somewhat diagrammatic plan view of a steering linkage and wheel suspension embodying the threaded pivot assemblies of this invention.

In FIG. 1 the reference numeral 10 designates generally an automobile chassis having longitudinal frame members 11, 11 and a transverse frame member 12. Wheel suspensions 13, 13 are pivotally mounted at their inner ends on the transverse member 12 and support the dirigible front wheels 14, 14 of the vehicle.

Figure 2:
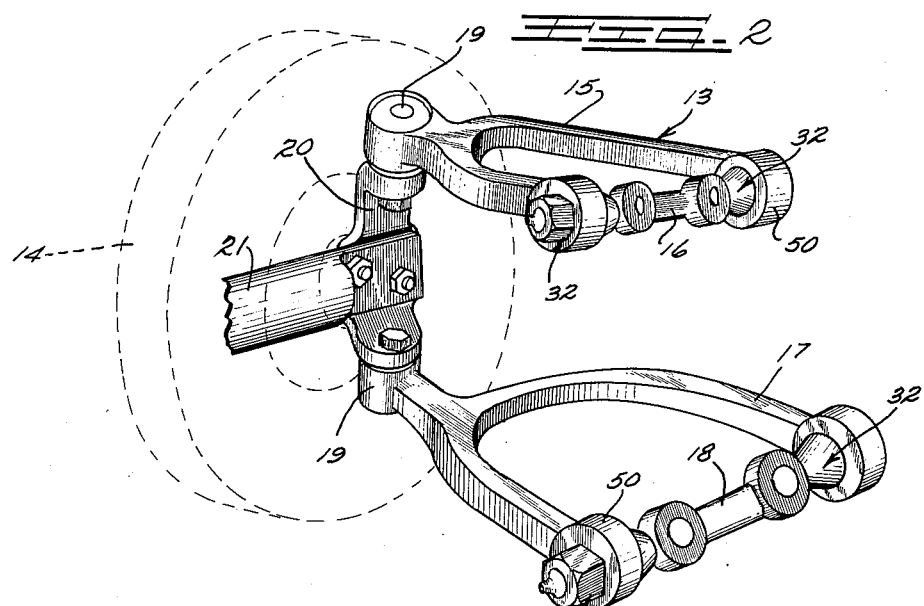
FIGURE 2 is a perspective view of a wheel suspension including the threaded pivot joints of this invention on the inner pivots of the upper and lower control arms.

As shown in FIG. 2 each wheel suspension 13 includes an upper control arm 15 pivotally mounted on the ends of a pivot shaft 16 which is affixed to the cross chassis member 12 and a lower control arm 17 pivotally mounted on the ends of a lower pivot shaft 18 also affixed to the cross chassis member 12. The control arms 15 and 16 carry ball and socket joints 19 at their outer ends which support a steering knuckle 20 having the conventional spindle on which the wheel 14 is rotatably mounted.

A steering arm or wheel arm 21 extends rearwardly from each steering knuckle 20 as shown in FIG. 1 and is connected by a ball and socket joint 22 which a tie rod 23. The inner ends of the tie rods 23 in turn are connected by ball and socket joints 24 to a cross link 25. One end of the cross link 25 is connected by a ball and socket joint 26 to the pitman arm 27 of a steering gear 28 carried on the side frame 11 of the chassis. The pitman arm is driven on a stud 29 projecting from the steering gear 28 to swing in an arc and longitudinally shift the center link 25.

The opposite end of the center link 25 is supported on an idler arm 30 carried from a bracket 31 mounted on the side frame 11 of the chassis.

In accordance with this invention threaded pivot joints 32 connect the control arms 15 and 17 with the ends of their pivot support shafts 16 and 18, connect the idler arm 30 with its bracket 31 and, if desired, may connect the swinging or outer end of the idler arm 30 with the cross link 25. Alternately a conventional ball and socket joint can be used to connect the cross link and idler arm. If the steering geometry is such that only pivot movements are needed at both the inner and outer ends of the idler arm both of these ends may be equipped with the pivot joints of this invention. On the other hand if the steering geometry is such that universal movement is required between the swinging end of the idler arm and the cross link, then a conventional ball and socket joint will be used at this swinging end of the idler arm.

As best shown in FIG. 5 the pivot joint 32 includes an internaally threaded outer tubular member 33 and an externally threaded rod member 33 threaded in the member 33. The external member 33 has a head portion 35 and a reduced diameter shank portion 36 with a shoulder 37 therebetween and with external self-tapping threads 38 on the shank portion 36.

The end of the head 35 has a grease fitting 39 threaded therein. The entire length of the shank 36 and a portion of the head 35 adjacent the shank are internally threaded.

The internal member 34 has a solid cylindrical unthreaded rod portion 40 with an integral bead or collar 41 at the end thereof. A short unthreaded reduced diameter cylindrical rod portion 42 is provided on the opposite side of the collar 41 and external threads 43 then extend all the way to the end of the rod.

The free end of the rod has an axial cylindrical bore 44 extending therein with at least the outer end portion provided with internal threads 45. This hollow end of the rod is split along its length with four axial slots 46 cut therethrough in 90° relationship and extending substantially the entire length of the bore 44. Four arcuate fingers 47 are thereby provided on the end of the internal member 34.

An externally threaded tapered plug 48 is threaded into the bore 44 and is sized so as to have an expanding force on the fingers 47. The plug 48 has a socket head 49 easily engaged by a wrench through the head 35 of the external member by removing the grease fitting 39 from this head.

The outer member 33 is threaded into its mounting boss 50 such as may be provided on the ends of the control arms 15 and 17 or on the bracket 31 for the idler arm or even on the end of the cross link 25 which is carried by the idler arm. The self-tapping threads 38 on the shank portion 36 of the outer member will cut their own threads in the boss 50 and the shouder 37 between the head 35 and shank 36 of the outer member is bottomed on the boss.

The inner member 34 is threaded into the outer member 33 for substantially the entire length of the shank 36 and threaded head portion 35 of the outer member. The relative axial position of the inner and outer members 33 and 34 can be controlled by the extent of threaded insertion of the inner member in the outer member for controlling, for example, the axial positions of the control arms relative to their pivot shafts.

A rubber or other resilient sealing boot 51 is snugly seated on the rod portion 42 of the inner member 34 and is bottomed on the collar 41 thereof as shown in FIG. 5. The boot has a recessed end 52 receiving the end of the external member 33 which projects beyond the boss 50 and the end face of the boot is bottomed on this boss. The boot retains lubricant in the joint and excludes dirt from the joint.

After the joint is threaded home in its mounting boss 50 and the internal joint member 34 is threaded into the external member the desired distance for accurate positioning of the pivot, the plug 48 is then tightened in the bore 44 to expand the fingers 47 and impart to the joint the exact desired resistance to rotation. This expansion control of the inner member 34 adjusts the radial torque necessary for operating the joint to the desired level and of course at the same time gives axial stability to the joint because as torque is applied to relatively rotate the joint parts, these parts also must shift axially relative to each other. To adjust the torque resistance of the joint it is not necessary to disassemble the operating components or to dismount the same from their supporting positions in the suspension and linkage. All that is necessary is the removal of the lubricant fitting 39 whereupon the socket wrench can be inserted through the head 35 of the outer member into the socket recess 49 of the plug 48. Control of operating resistance of the joint makes possible individual control of wheel pivoting as well as steering linkage resistance.

An alternate form of pivot joint according to this invention is shown at 32a in FIGS. 8 and 9. In this embodiment 32a the joint has an external contractible member 60, an internal member 61 and a locking nut 62. The member 60 has a head 63 with an externally threaded shank 64 projecting therefrom and a shoulder 65 therebetween. The externally threaded shank 64 is hollow along its length and is also internally threaded to receive the threaded end 66 of the member 61.

The end of the shank 64 is tapered externally at 67 and is longitudinally slotted at 68 with four slots 90° apart thereby providing four externally tapered fingers 69.

The shank 64 is threaded in the mounting boss 50 with the shoulder 65 of the head bottomed on the boss and with the slotted tapered end 67 projecting beyond the boss. The locking nut 62 is threaded on this projecting end and contracts the end to tighten the fingers 69 against the threaded portion 66 of the internal member 61. Thus torque resistance is controlled by the tightening of the nut 62 which wedges the fingers 69 against the threaded end 66 of the internal member.

If desired of course a jam nut can be threaded on the member 61 against the locking nut 62.

From the above description it will therefore be understood that this invention provides easily adjustable threaded pivot joints for ball joint wheel suspensions and center link steering linkages of automotive vehicles whereby the front end of a vehicle can be easily tuned to meet individual requirements by controlling the torque resistance and axial stability of the joints.

We claim as our invention:

A threaded pivot joint comprising a hollow outer member having an integral wrench head and an externally threaded shank, a solid rod member having a portion thereof threaded into said shank with a split expansible terminal end having a length substantially less than the length of said threaded portion adjacent the head, said head having an access hole aligned with said end, an expansion plug threaded in said end reached by a tool inserted through said hole, a collar on said solid member spaced from the shank, a resilient boot on said solid member bottomed on said collar, a boss threaded around the shank having the head bottomed thereon and the shank projecting therefrom, and said boot embracing the projecting shank and sealed against the boss.

References Cited by the Examiner
UNITED STATES PATENTS

| | | | |
|---|---|---|---|
| 2,428,086 | 9/1947 | Leighton | 287—93 X |
| 2,464,982 | 3/1949 | Leighton | 280—95 |
| 2,575,641 | 11/1951 | Summers | 151—19 |
| 2,631,864 | 3/1953 | Dick et al. | 280—95 |
| 2,650,844 | 9/1953 | Shemorry | 280—95 X |
| 2,684,253 | 7/1954 | Leighton | 280—96.2 |
| 2,689,756 | 9/1954 | Carlson | 287—93 |
| 2,820,396 | 1/1958 | Pressey. | |
| 2,835,521 | 5/1958 | White | 280—95 X |
| 2,913,251 | 11/1959 | Herbenar | 280—96.1 |
| 2,954,993 | 10/1960 | Scheublein | 280—96.2 X |
| 3,112,123 | 11/1963 | True | 287—93 |

FOREIGN PATENTS

| | | |
|---|---|---|
| 119,498 | 9/1918 | Great Britain. |
| 675,305 | 10/1929 | France. |

BENJAMIN HERSH, *Primary Examiner.*

KENNETH H. BETTS, MILTON BUCHLER,
*Examiners.*